US005490319A

United States Patent [19]

Nakamura et al.

[11] Patent Number: 5,490,319

[45] Date of Patent: Feb. 13, 1996

[54] THERMOTROPIC LIQUID CRYSTAL POLYMER COMPOSITION AND INSULATOR

[75] Inventors: Toshio Nakamura; Yoshimi Soeda; Toshifumi Miyasaka; Minoru Iwata, all of Kanagawa, Japan

[73] Assignee: Ebara Corporation, Tokyo, Japan

[21] Appl. No.: 285,278

[22] Filed: Aug. 3, 1994

Related U.S. Application Data

[60] Continuation-in-part of Ser. No. 106,873, Sep. 28, 1993, which is a division of Ser. No. 9,945, Jan. 27, 1993, abandoned.

[51] Int. Cl.⁶ ............................ H02K 15/00; H02K 1/04; H02K 15/12; H02K 15/14

[52] U.S. Cl. ................. 29/596; 264/272.11; 264/272.13; 264/272.17; 264/272.19; 264/272.2; 310/43; 310/45; 310/86; 310/87; 524/539; 524/443

[58] Field of Search ................................ 310/43, 45, 86, 310/87; 264/272.2, 272.19, 272.1, 272.11, 272.13, 272.17; 29/596; 524/539, 443

[56] References Cited

U.S. PATENT DOCUMENTS

| | | | |
|---|---|---|---|
| 2,953,699 | 9/1960 | Redding, Jr. | 310/43 |
| 3,742,595 | 7/1973 | Lykes | 29/596 |
| 4,048,530 | 9/1977 | Kaufman, Jr. | 310/43 |
| 4,352,897 | 10/1982 | Ogata et al. | 310/43 |
| 4,720,424 | 1/1988 | Eickman et al. | 264/272.11 |

FOREIGN PATENT DOCUMENTS

| | | |
|---|---|---|
| 0115967A3 | 8/1984 | European Pat. Off. . |
| 0167009A1 | 1/1986 | European Pat. Off. . |
| 0423508A1 | 4/1991 | European Pat. Off. . |
| 0423510A1 | 4/1991 | European Pat. Off. . |

OTHER PUBLICATIONS

European Search Report No. EP 93 10 1340, dated Nov. 2, 1993.

AN 89–319265 (Abstract), JP-A-1 236 253 (Yazaki).

AN 79–47913B (Abstract), JP-A-54 061 700 (Fujitsu).

AN 89–104191 (Abstract), JP-1-1 051 460 (Teijin).

*Primary Examiner*—Paul R. Michl
*Assistant Examiner*—Patrick Niland
*Attorney, Agent, or Firm*—Oblon, Spivak, McClelland, Maier & Neustadt

[57] ABSTRACT

The improved thermotropic LCP composition comprises 10–13 wt. % of a thermotropic liquid crystal polymer resin and 90–87 wt. % of zircon and is useful as an electrical insulator. The composition is a good electrical insulator, permits good heat conduction and experiences small thermal expansion, thus insuring high reliability. The composition may be injection molded to form an electrically insulated housing of a stator for electric machines or appliances that includes a coil and terminals thereof.

3 Claims, 5 Drawing Sheets

31 15 32 7 4 14 5 3 6 10 9 7 1 2 8 11 6 10 5 3 14 4 33 7 34 37 36 35

THERMOTROPIC LIQUID CRYSTAL POLYMER COMPOSITION AND INSULATOR

This application is a CIP of U.S. Ser. No. 08/106,873, filed Sep. 28, 1993, which is a divisional of U.S. Ser. No. 08/009,945, filed Jan. 27, 1993, abandoned.

BACKGROUND OF THE INVENTION

1. Field of the Invention

This invention relates to a thermotropic liquid crystal polymer (referred to as LCP) composition and, more particularly, to an electrical insulator which, when injection molded, is suitable for use in the structure of electric machines and appliances.

2. Description of the Prior Art

It has been common practice to reinforce liquid crystal polymers with fillers but the filler loading has typically been up to 30–40 wt. % and it has not been known to improve the insulating and heat conducting properties of the polymers by loading them with fillers through injection molding.

Magnetic iron cores in the stators of small motors, stator coils mounted on the cores and their terminals are exposed to various adverse conditions during practical use such as mechanical stresses due to the pulsating torque and heat generation that accompany motor operation, as well as moisture, water, corrosive atmosphere, corrosive liquids and heat dissipation and, hence, studies have been made to develop effective methods for securing and insulating those members.

A common method adopted to this end comprises insulating stator coils with insulating varnish while securing them to a stator's magnetic iron core using an adhesive, then providing a housing using cast metal parts. However, this method involves not only many steps of manufacture but also much time and materials, thereby increasing the cost of the product. Furthermore, heat and cold cycles and mechanical vibrations that are produced during the operation of rotating machines have frequently caused debonding or deterioration in the insulating performance. These defects are particularly marked in motors that are caused to run at high speed at high frequency on a variable frequency power supply, as by PWM inverter control (e.g. variable voltage, variable frequency control, generally referred to as "VVVF control").

With a view to solving the problem, a method has been proposed that performs resin molding on the stator iron core and coils as a whole. The resin composition that is to be used in this method and which is capable of monolithic molding is required to meet the following requirements. First, the resin composition must exhibit very good adhesion to the stator's magnetic iron core and coil. Second, it must retain its insulating quality for a prolonged time while enhancing the dissipation of heat generated during the operation of a rotating machine and yet without causing debonding. Third, it is required that heat and cold cycles due to the start and stop of the rotor or the vibrations that occur during operation should not develop cracks in the molding layer to deteriorate the insulating performance or dimensional precision of the machine, thereby insuring that the rotor will turn smoothly. Fourthly, electromagnetic considerations for rotating machines require that the many slots in the stator's magnetic iron core should be completely filled with the resin to avoid any disturbances in the distribution of electric lines of force while, at the same time, the pulsating vibrations that occur during the operation of the rotating machine should not cause the resin to separate from the core, develop cracks or break into pieces that collide against the rotor.

Most importantly, the resin composition must have good insulating quality among other things. Once molding is accomplished, retouching is no longer possible and, hence, absolute reliability is required for the characteristics of the resin composition.

For resin molding of conventional electric machines and appliances, liquid unsaturated polyester resins, vinyl ester resins and epoxy resins have been used by means of cast molding, low-pressure molding or vacuum cast molding, but this method has caused the following problems in terms of manufacture and performance: (1) long curing time; (2) the filler is precipitated during curing to form a resin-rich portion and, hence, cracking is prone to occur on account of heat cycles: (3) the shaped part must be enclosed with a casing (container) and this makes it difficult to produce complexly shaped parts: (4) air voids are prone to occur in the shaped part but they are not desirable from the viewpoint of performance; and (5) the part being cured is highly susceptible to the effect of atmospheric moisture. In short, cracking will occur during resin molding by the prior art technique on account of various factors including shrinkage upon curing, heat cycles, air voids and the difference in the degree of curing, and this has made the occurrence of time-dependent deterioration unavoidable.

It has generally been held that solving all of the aforementioned problems of the prior art is extremely difficult. An injection molding technique that is capable of high filler loading and high production rate is useful as a means for solving the problems but injection molding materials so far available have defied injection molding since they are liquid resins which involve chemical reaction.

SUMMARY OF THE INVENTION

The present invention has been accomplished under these circumstances and has as the general object providing an injection molding material that is free from the aforementioned problems of the prior art. Stated more specifically, it is an object of the present invention to provide a thermotropic LCP composition that is improved in handling property and adaptability for mass production and which has high insulating, heat conducting, thermal expansion and reliability characteristics.

It is another object of the present invention to provide an electrical insulator having the same features as mentioned just above.

It is still another object of the present invention to provide a stator that is resin-molded using said electrical insulator.

Other objects and advantages of the present invention will be become apparent to those skilled in the art from the following description and disclosure.

DETAILED DESCRIPTION OF THE INVENTION

Figure 1:
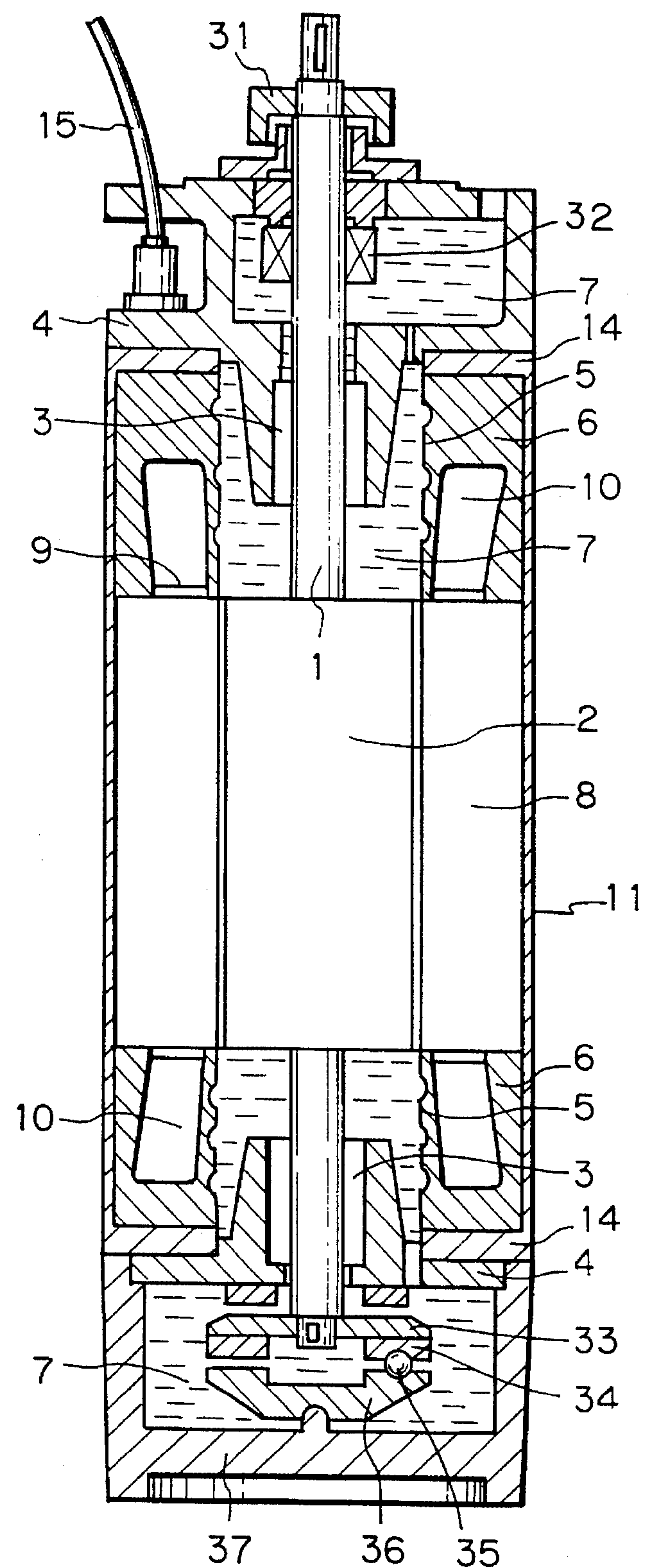
FIG. 1 is a sectional view of a submersible canned motor according to the present invention.

The first object can be attained by a thermotropic LCP composition Comprising 10–50 wt. % of a thermotropic LCP resin and 90–50 wt. % of zircon, preferably 10–20 wt. % resin and 80–90 wt. % zircon, and most preferably 10–13 wt. % resin and 87–90 wt. % zircon.

The second object can be attained by an electrical insulator having 10–50 wt. % of a thermotropic LCP resin filled with 90–50 wt. % of zircon comprising particles of 1–60 μm in size, preferably 10–20 wt. % resin and 80–90 wt. % zircon, and most preferably 10–13 wt. % resin and 87–90 wt. % zircon.

The third object can be attained by a resin-molded stator for electric machines or appliances that has an insulated housing formed by the injection molding, using the above-stated electric insulator, of a coil with or without iron core for electric machines or appliances and the entire part of the stator inclusive of said coil and terminals thereof.

The stator of the present invention not only insures good electrical insulation but also has an expansion coefficient very close to those of metals; hence, it is free from any debonding and cracking, thus claiming high reliability.

In accordance with the present invention, a thermotropic LCP that has an inorganic mineral filler of high heat conductivity blended homogeneously is injection molded and this enables the production of a resin molded electric machine or appliance that is not only free from all defects of the prior art but which is also furnished with new capabilities such as vibration damping characteristics and barrier quality against corrosive gases. Furthermore, the adoption of injection molding process doubles or even triples the production rate of the prior art.

The thermotropic LCP resin as used in the present invention is a thermoplastic aromatic polyester. According to the differences in basic molecular structure, thermotropic LCPs are currently available in three types and they vary greatly in heat resistance. While all types are copolymers of polyester types containing parahydroxybenzoic acid (PHB), type 1 is a copolymer of terephthalic acid (TA) and p,p'-biphenol (BP) with a heat distortion temperature (HDT) or deflection temperature under load of 275°–350° C.; type 2 is chiefly composed of 2-oxy-6-naphtoic acid (2,6-NA) with HDT of 180°–240° C.; and type 3 is a copolymer of PHB and PET (polyethylene terephthalate) with HDT of 64°–210° C. Each type has a low melt index and high fluidity, exhibiting high dimensional stability due to low linear expansion coefficient, small shrinkage upon molding and small dimensional changes upon moisture absorption, as well as good vibration damping characteristics, high strength and high elastic modulus; at the same time, the three types of the thermotropic LCP resin have the high electrical strength and arc resistance that are necessary for use with electric machines and appliances.

High-molecular weight materials are generally poor in heat conduction and, in particular, thermotropic LCPs have great anisotropy under the influence of crystal orientation during molding and their weld strength tends to decrease. Hence, a large amount of inorganic mineral filler is used in the present invention with a view to achieving improvements in that nature of thermotropic LCPS. To attain the primary purpose of not deteriorating electrical characteristics and for the secondary purpose of filling small gaps such as the spaces between turns of the stator coil with the thermotropic LCP, the fine particles of zircon having the structural formula $ZrSiO_4$, such as zircon sand (zircon flour; 350 mesh pass ≧96.5%; ≦about 60 μm) may be used as an inorganic mineral.

Zircon flour is used in an amount of 50–90%, desirably at least 80%, and preferably at least 87% by weight of the thermotropic LCP, and the two ingredients are mixed under heating at a temperature of about 260°–330° C. to form pellets (grains) having a homogeneous composition. Besides zircon, various inorganic mineral fillers may be mixed with the thermotropic LCP in the present invention in an amount of up to 40% by volume of zircon and they include: silica, clay, talc, asbestos, kaolin, dolomite, chromite, alumina, mica, magnesite, titanium oxide, beryllium oxide, magnesium oxide, calcium oxide, slate, chalk, silica sand, Shirasu (mixture of volcanic ash and pumice produced in a southern region of Kyushu, Japan), mountain sand, river sand, fused quartz, glass powder, and other various materials prepared by processing naturally. occurring inorganic substances into a powder form. The amount of addition of these inorganic mineral fillers may be expressed in terms of weight ratio as determined by calculation on the basis of the specific gravity of zircon.

The amount of addition of zircon is specified to be at least 50% by weight in the present invention, preferably at least 80%, and mot preferably at least 87% because below 50%, the heat conductivity that can be attained is too low to justify the addition of zircon. If zircon is added in amounts exceeding 90%, the mixer and pelletizer and, even the injection molding machine and the mold may wear rapidly or may be subjected to excessive load, thus making it substantially impossible to perform the intended mixing operation; furthermore, voids will occur in the shaped part of the polymer composition to cause deterioration in its characteristics.

Containing zircon in a large amount, the thermotropic LCP composition of the present invention is an inexpensive and strong electrical insulator that is excellent in electrically insulating, heat conducting and heat resisting properties. By performing monolithic molding with this insulator, electrical insulation and the formation of a housing can be accomplished simultaneously to produce a stator that has good electrical insulation performance, that is small and lightweight and that insures high reliability.

The injection molding pressure is generally in the range of 400–1,400 $kgf/cm^2$ (Kilogram force per square centimeter), but it varies depending on the shape of the molding. When injection molding is to be performed in two stages, the injection pressure is generally at about 600–1,400 $kgf/cm^2$ for the first stage, and at about 400–700 $kgf/cm^2$ for the second stage.

The two-step injection molding may be performed in the following manner. In the first stage of injection molding, the slots in the stator core and the space around the coil end portions at opposite ends of the core are filled with a resin composition at a pressure of 600–1400 $kgf/cm^2$. In the second stage, a can, a frame and frame side plates are mounted on the thus produced stator core to form a submersible motor and the resulting space around the coil end portions is filled with a resin composition at a pressure of 400–700 kgf/cm$^2$. If desired, the stator made in the first stage may be used as part of a submersible motor without filling with the resin composition in the second stage.

The following examples are provided for the purpose of further illustrating the present invention but are in no way to be taken as limiting.

EXAMPLE 1

Thermotropic LCP of type 3 (HDT: 170° C.) composed of a copolymer of parahydroxybenzoic acid and polyethylene terephthalate was mixed with 85.3% by weight of zircon flour (350 mesh pass ≧96.5%; ≦about 60 μm) at a temperature of about 270°–280° C. to produce a thermotropic LCP composition of the present invention. The zircon flour consisted of 66 wt. % zirconia ($ZrO_2$) and 33 wt. % silicon dioxide.

The thermal conductivity and linear thermal expansion coefficient of this thermotropic LCP composition were as shown in Table 1, which also show the data for a material (comparison 1) composed of bisphenol A type epoxy resin and zircon sand (86.8 wt. %, very coarse as the peak of particle size distribution being 105–125 μm), a material (comparison 2) composed of fibrous glass reinforced plastics (unsaturated polyester and glass fiber: GF content: 30 wt. %), a material (comparison 3) composed of polyamide 66 and glass fiber (GF content: 30 wt. %), and a material (comparison 4) composed of thermotropic LCP and glass fiber (GF content: 30 wt. %).

TABLE 1

| Run | Thermal conductivity (Cal/cm · SEC · °C.) | Linear thermal expansion ($\times10^{-5}$/°C.) |
|---|---|---|
| Ex. 1 | 0.0055 | 1.97 |
| Comp. | | |
| Ex. 1 | 0.0040 | 2.5 |
| Ex. 2 | 0.0007 | 3.0 |
| Ex. 3 | 0.0006 | 2.5 |
| Ex. 4 | 0.0006 | 2.2 |

EXAMPLE 2

Additional thermotropic LCP compositions were prepared from a thermotropic LCP and zircon flour as in Example 1, except that the zircon flour content was varied at 45, 60, 70, 80, 81, 82, 83, 84, 85, 86, 87, 88, 89, 90 and 95% by weight. The thermal conductivities and insulation breakdown voltages of the samples were measured and the results are shown in Table 2 together with-the data for the inherent values (0 and 100% zircon).

TABLE 2

| ZIRCON FLOUR content (wt %) | THERMAL CONDUCTIVITY (Cal/cm · sec · °C.) | INSULATION BREAKDOWN voltage (kV/mm) |
|---|---|---|
| 0 | 0.00033 | 20.1 |
| 45 | 0.00091 | 20.3 |
| 60 | 0.00157 | 20.5 |
| 70 | 0.00251 | 20.7 |
| 80 | 0.0041 | 20.8 |
| 81 | 0.0043 | 20.8 |
| 82 | 0.00455 | 20.9 |
| 83 | 0.0048 | 20.9 |
| 84 | 0.0052 | 20.9 |
| 85 | 0.0055 | 20.9 |

TABLE 2-continued

| ZIRCON FLOUR content (wt %) | THERMAL CONDUCTIVITY (Cal/cm · sec · °C.) | INSULATION BREAKDOWN voltage (kV/mm) |
|---|---|---|
| 86 | 0.0059 | 21.0 |
| 87 | 0.0063 | 21.1 |
| 88 | 0.0068 | 21.1 |
| 89 | 0.0070 | 21.2 |
| 90 | 0.0072 | 21.2 |
| 95 | 0.0058 | 13.9 |
| 100 | 0.0040 | NA BECAUSE OF POWDER |

As Tables 1 and 2 show, the samples of the present invention were high in thermal conductivity and insulation breakdown voltage but low in linear thermal expansion coefficient. It can also be seen that the higher the content of zircon flour, the higher the thermal conductivity. Table 2 shows in particular that when the content of zircon flour exceeded 90% by weight, voids occurred in the shaped part of thermotropic LCP composition, causing gradual deterioration in characteristics.

EXAMPLE 3

A submersible canned motor was fabricated using a thermotropic LCP composition of the present invention and a temperature test was conducted in order to check for improvement in heat conduction. The results are shown in Table 3. The stator could be cooled very efficiently on account of improved heat conduction and heat dissipation from the coil-ends was particularly good to provide a uniform temperature profile throughout the motor.

TABLE 3

| Filled materials | Increase in coil temperature (by resistance method) deg C. | Increase in coil end temperature (by thermocouple method) deg C. | Temperature of cooling water (by thermocouple method) °C. |
|---|---|---|---|
| *Thermotropic LCP composition (Invention) | 35.5 | 46.5 | 20.5 |
| **Epoxy resin composition (Comparison 5) | 48.5 | 80.0 | 20.5 |
| ***Air composition (Comparison 6) | 66.2 | 112.5 | 20.5 |

*Thermotropic LCP composition is composed of mixture of 15 wt % of a thermotropic liquid crystal polymer resin and 85 wt % of zircon.
**Epoxy resin composition is composed.of mixture of 15 wt % of an epoxy resin and 85 wt % of silica sand.
***Air composition is composed of mixture of 60 vol % of air and 40 vol % of an inert dry gas (He gas).

A section of the submersible canned motor is shown in FIG. 1, in which numeral 1 denotes the shaft of the motor, 2 is the rotor fitted on the shaft 1, 3 is the bearing, 4 is the bracket supporting the shaft 1 via the bearing 3. 5 is the stator can isolating a stator compartment 6 from a rotor compartment 7, 8 is the stator core, 9 is electrical insulating paper, 10 is a coil, 11 is the frame in which the stator core 8 is fitted, 14 is the side plate of the frame, and 15 is a lead wire.

The stator compartment 6 is filled for molding with the thermotropic LCP composition of the present invention which is composed of a thermotropic LCP resin and a zircon flour, and the rotor compartment 7 is filled with an aqueous solution of propylene glycol.

Shown by 31 is a sand slinger, 32 is an oil seal mechanism for preventing dust and foul water from entering the rotor compartment, 33 is thrust carbon, 9-4 is a thrust pad, 35 is a centering ball, 36 is a thrust disk, and 37 is a thrust housing or a thrust bearing mechanism which bears, via shaft 1, the hydraulic axial thrust force that develops when a pump connected to the submersible canned motor under consideration is operated.

Table 3 also shows data for Comparison 5 which had the stator compartment 6 filled with a mixture of epoxy resin and silica, as well as data for Comparison 6 which had the stator compartment 6 filled with a mixture of air and an inert dry gas (He gas).

EXAMPLE 4

In this example, a method is described that enables the stator compartment of a submersible motor to be filled with the molding material of the present invention which has high electrical insulating and heat conducting properties.

Figure 2:
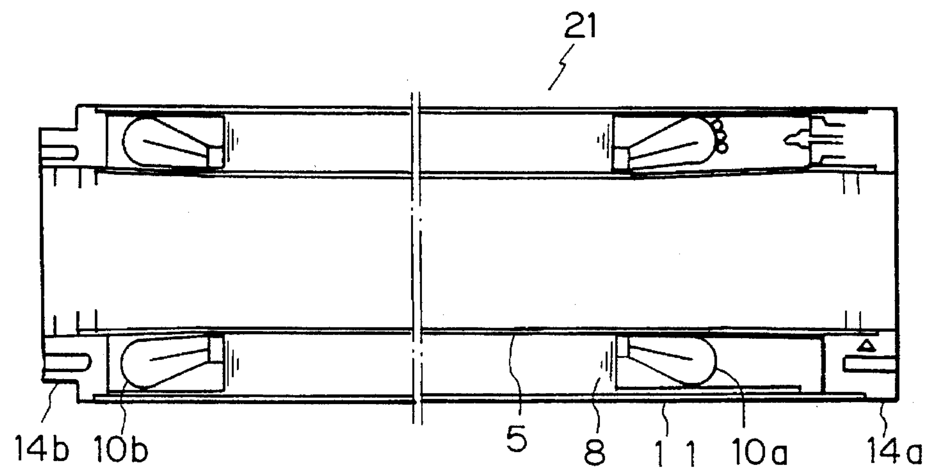
FIG. 2 is a sectional view of the stator of submersible motor according to the present invention.

FIG. 2 shows a section of the stator of a submersible motor. Shown by 8 is a silicon steel sheet forming the stator core and the necessary number of such steel sheets are laminated to provide a rated motor capacity and fixed within a frame 11 in predetermined position. Disposed between adjacent steel sheets is a coil 10 protected by a suitable means such as electrical insulating paper. thus forming coil ends 10*a* and 10*b* at the respective terminals.

The stator formed a closed compartment by means of a frame side plate 14*a* on load side, frame side plate 14*b* on opposite side, and can 5. Both coil ends 10*a* and 10*b* were filled with the molding material of the present invention which was injected through gates provided at the respective side plates 14*a* and 14*b*.

Figure 3:
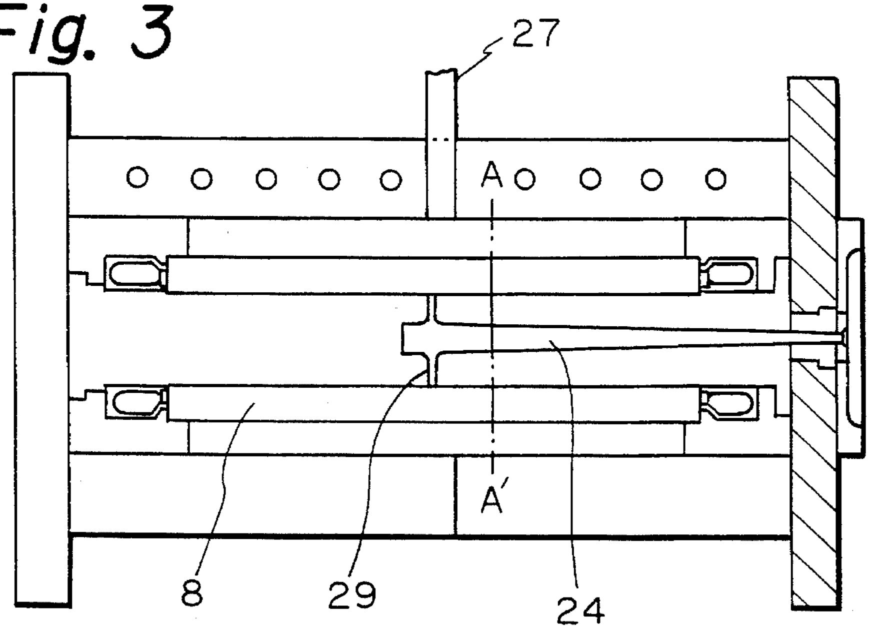
FIG. 3 is a sectional view showing an illustrative mold structure that is to be filled for injection molding.
Figure 4:
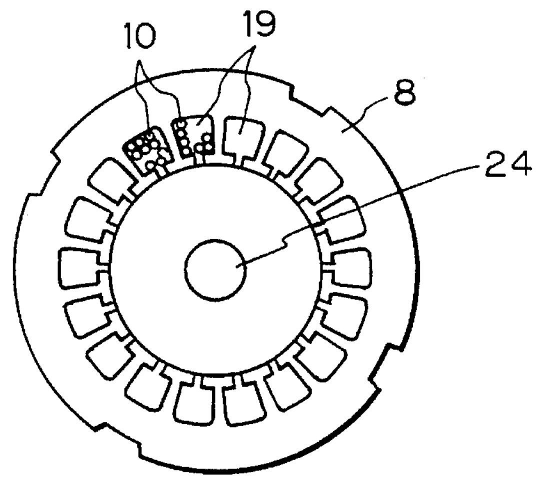
FIG. 4 is a cross section of FIG. 3 as taken on line A—A'.
Figure 5:
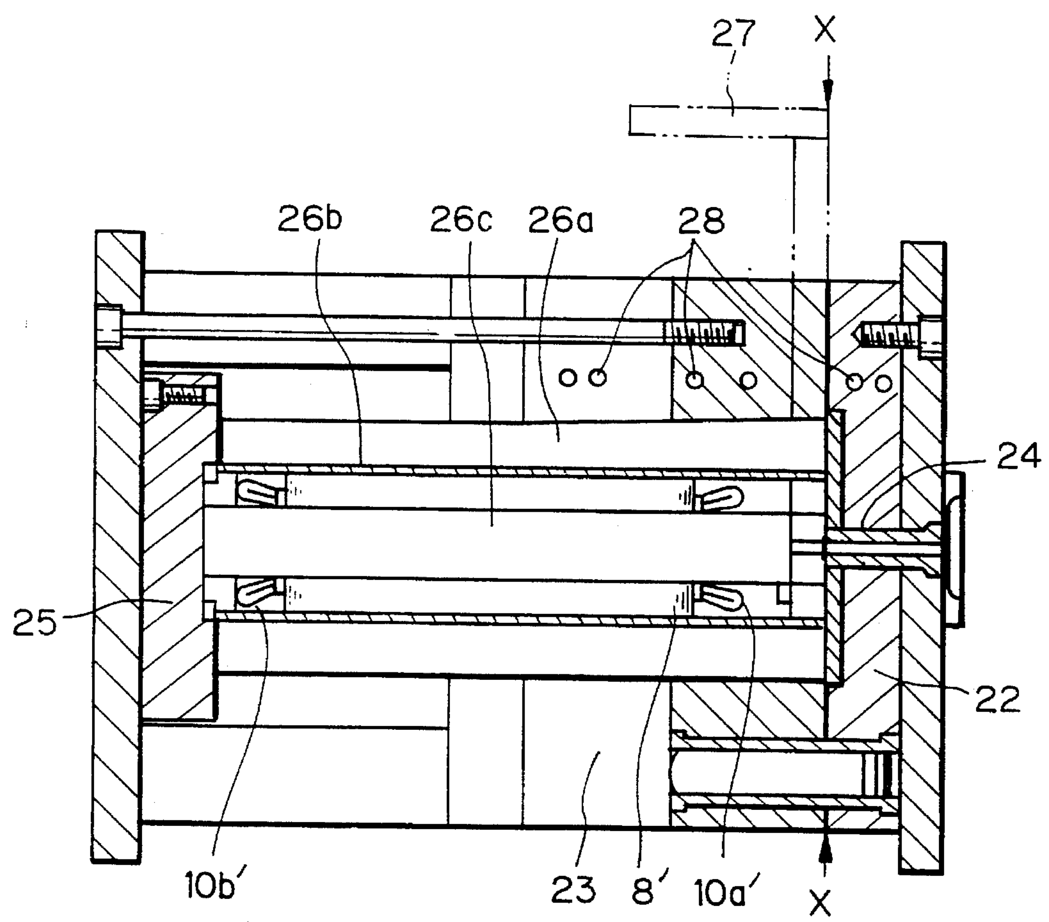
FIG. 5 is a sectional view showing another illustrative mold structure that is to be filled for injection molding.

FIGS. 3 and 5 show examples of a mold structure for filling the stator compartment of the submersible motor shown in FIG. 2 with the molding material in Example 1 of the present invention by injection molding. FIG. 4 shows a cross section of FIG. 3 as taken on line A—A'. FIGS. 3 and 4 show a mold for primary injection molding, by means of which gaps can be filled completely without causing damage to the windings of coil LO arranged in slots 19 in a stator core 8, as well as coil ends 10*a* and 10*b* at both terminals of the coil. FIG. 5 shows a mold for secondary injection molding. After primary injection molding, can 5, frame 11 and frame side plates 14*a* and 14*b* are mounted on the produced stator core to form a submersible motor and the resulting space around the coil end portions is filled by the secondary injection molding.

In the primary injection molding, a stator core with the coil windings placed in slots is set in the mold and the resin of the present invention is injected at high pressure for filling the mold via a sprue 24 and gate 29 provided in the hollow portion of the stator core. Since the filling resin material is to flow by large length, the injection pressure was appropriately in the range of 800 1200 kgf/cm$^2$ in Example 4.

The mold for secondary injection is shown more specifically in FIG. 5. The mold is divided by line X—X into two parts, a fixed part 22 and a movable part 23, each being furnished with a temperature control circuit 28 for adjusting the mold temperature. Stator 21 is reinforced with jigs 26*a*, 26*b* and 26*c* for preventing deformation of the stator and lifted by a hoist 27 so that it is set properly in the movable part 23.

With the stator 21 set in proper position, the molding material is injected through the sprue 24 for molding. Thereafter, the mold is opened at parting line X—X and ejector plate 25 is actuated so that the stator 21 is extracted from the movable part 23 together with reinforcements 26*a*, 26*b* and 26*c* and recovered by means of the hoist 27.

This procedure completes the process of filling one of the two coil ends 10*a* and 10*b* and, by repeating the same procedure, the other coil end can be filled for molding. In the secondary injection molding, the cavity to be filled has a large mass (capacity) but the molding polymer composition need to flow by a short length, so an injection pressure of about 500 kgf/cm$^2$ is sufficient to effect the necessary filling of the mold.

EXAMPLE 5

Figure 6:
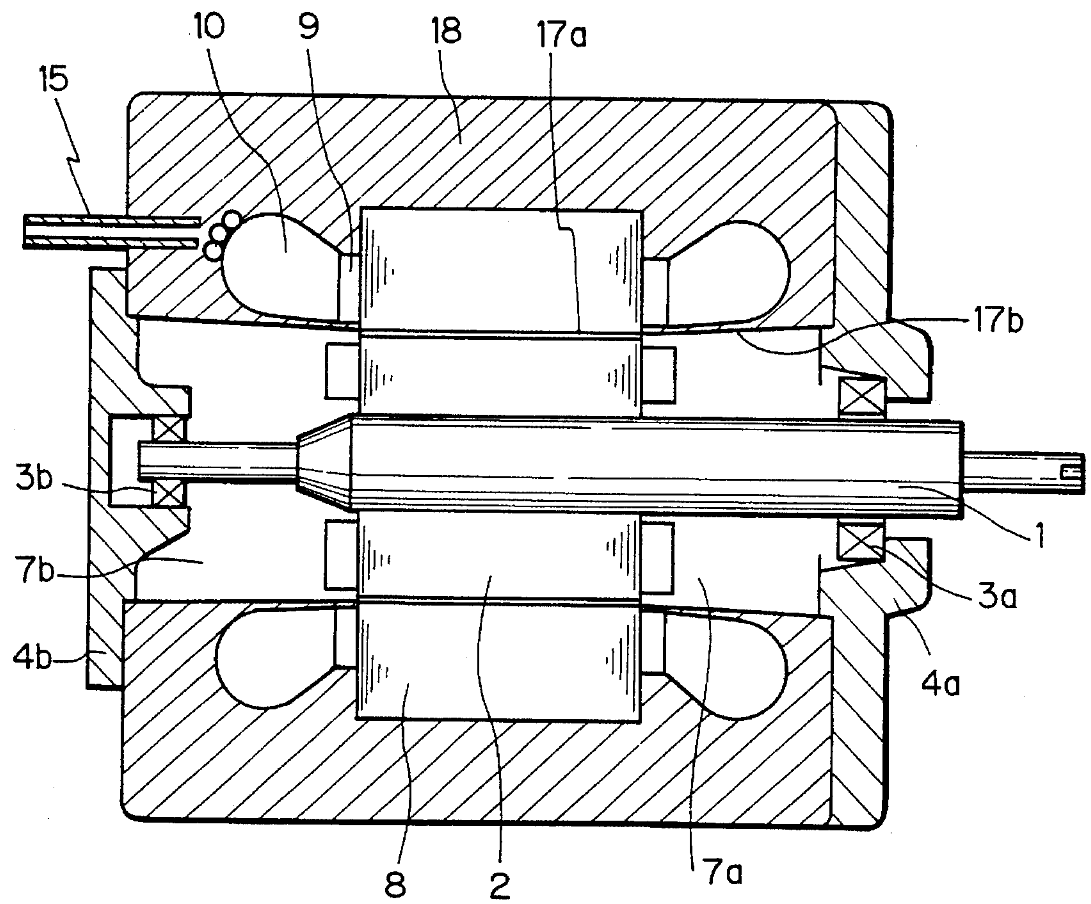
FIG. 6 is a sectional view of a resin-molded motor according to the present invention.

FIG. 6 shows a section of a motor that is resin molded in accordance with the present invention. Shown by 1 is the shaft of the motor, 2 is a rotor fitted on the shaft 1, 3*a* and 3*b* are bearings, 4*a* and 4*b* are brackets that supports the shaft 1 via the bearings 3*a* and 3*b*, 17*a* and 17*b* are resin molded cans that isolates a resin molding portion 18 from rotor compartments 7*a* and 7*b* and which are formed as an integral part of the resin molding portion 18 without creating any borderline, 8 is a stator core, 9 is insulating paper, 10 is a coil, 18 is the resin molding portion which serves as a housing in which the stator core 8, coil 10 and electrical insulating paper 9 are confined forming an integral assembly (the stator compartment 6 shown in FIG. 1 is included within this portion), and 15 is a lead wire. The rotor compartments 7*a* and 7*b* are either vacuum or filled with a fluid (gas or liquid).

Figure 7:
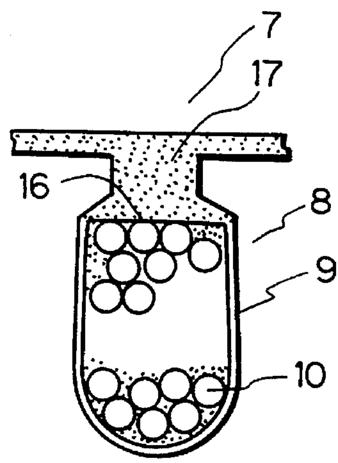
FIG. 7 is a sectional view showing details of a part of the stator core and resin-molded can that are shown in FIG. 6.

FIG. 7 is a sectional view showing details of part of the stator core 8 and resin molded can 17 which are shown in FIG. 6. Shown by 8 is the stator core, 17 is the resin molded can, 9 is electrical insulating paper, 10 is the coil and 16 is a wedge. These members are confined forming an integral assembly within the resin molding portion 18 which serves as a housing. The resin molding portion 18 also serves as stator can 17 in the area where the stator core 8 faces the rotor 2, thereby achieving isolation from the rotor compartment 7.

EXAMPLE 6

Figure 8:
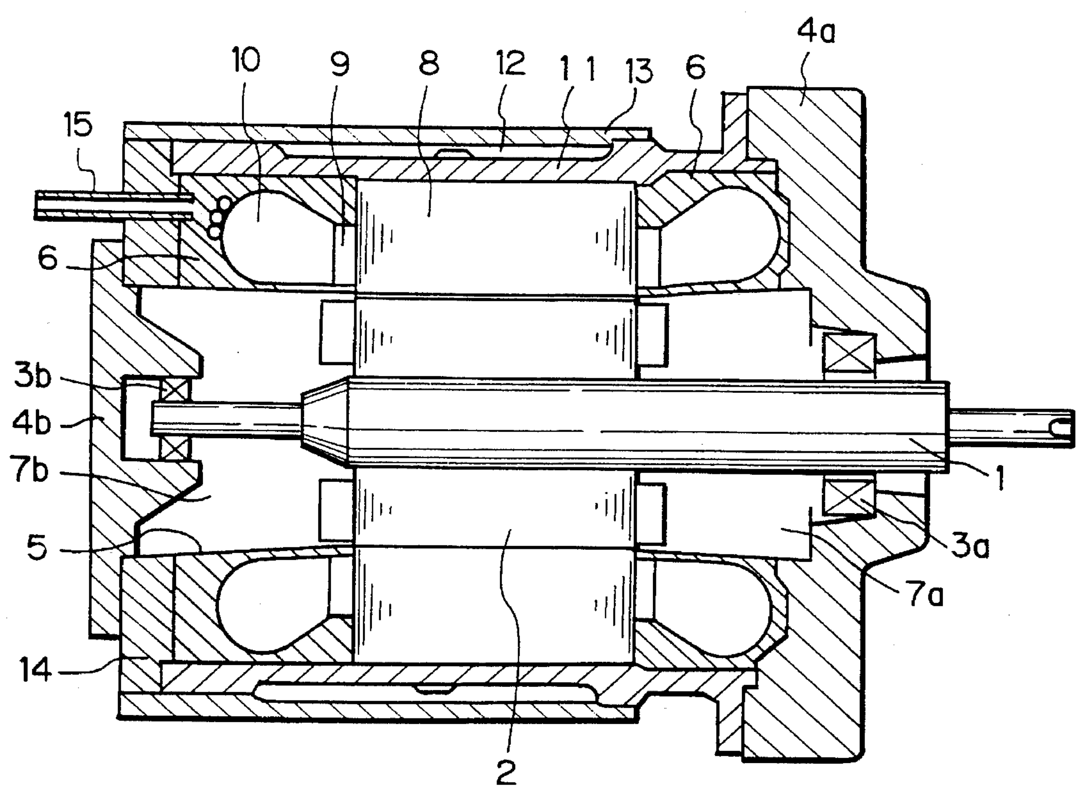
FIG. 8 is a sectional view showing another example of the resin-molded motor according to the present invention.

FIG. 8 is a sectional view showing another motor that is resin molded in accordance with the present invention. Shown by 1 is the shaft of the canned motor, 2 is a rotor fitted on the shaft 1, 3*a* and 3*b* are bearings, 4*a* and 4*b* are brackets that support the shaft 1 via bearings 3*a* and 3*b*, 5 is a stator can that isolates stator compartment 6 from rotor compartments 7*a* and 7*b*, 8 is a stator core, 9 is electrical insulating paper, 10 is a coil, 11 is a frame in which the stator core 8 is fitted in position, 12 is a cooling water compartment, 13 is a cooling jacket, 14 is a frame side plate, and 15 is a lead wire.

The stator compartment 6 is filled with a thermotropic LCP composition that consists of a thermotropic LCP and a zircon flour as indicated in Example 1 of the present invention, and the rotor compartments 7*a* and 7*b* are either vacuum or filled with a fluid (gas or liquid).

The thermotropic LCP composition of the present invention has high insulating, heat conducting, heat expansion and reliability characteristics. If this composition is used as an electrical insulator to make an electrically insulated housing of a stator for electric machines or appliances, a resin molded stator can be produced that is not only rugged and satisfactory in adhesion but which also insures good thermal stability and electrically insulating property.

What is claimed is:

1. A method for preparing a resin molded stator of a submersible motor comprising the steps of:

mixing about 10–13 percent by weight of a thermoplastic liquid crystalline polymer resin with about 90–87 percent by weight of zircon comprising particles of about 1–60 μm in size while heating at a temperature of about 260°–330° C. to form pellets comprising a homogenous thermotropic polymer composition; and performing injection molding with the pellets at a temperature of about 260°–330° C. through two stages, the first stage in which the slots in the stator core and the space around the coil end portions at opposite ends of the core are filled with a resin composition at a pressure of 600–1400 $kgf/cm^2$ and the second stage in which a can, a frame and frame side plates are mounted on the thus produced stator core to form a submersible motor and the resulting space around the coil end portions is filled with a resin composition at a pressure of 400–700 $kgf/cm^2$.

2. The method as claimed in claim 1, wherein said thermoplastic liquid crystalline polymer is an aromatic polyester.

3. The method as claimed in claim 1, wherein said thermoplastic liquid crystalline polymer resin is a copolymer of parahydroxybenzoic acid and polyethylene terephthalate.

* * * * *

UNITED STATES PATENT AND TRADEMARK OFFICE

CERTIFICATE OF CORRECTION

PATENT NO. : 5,490,319

DATED : February 13, 1996

INVENTOR(S) : Toshio NAKAMURA et al.

It is certified that error appears in the above-indentified patent and that said Letters Patent is hereby corrected as shown below:

On the title page, Item [30], the Foreign Application Priority Data is missing. It should read:

--[30] Foreign Application Priority Data

Jan. 29, 1992 [JP] Japan..... 4-36926--

Signed and Sealed this

Twenty-eighth Day of May, 1996

Attest:

BRUCE LEHMAN

*Attesting Officer* *Commissioner of Patents and Trademarks*